US 6,559,869 B1

(12) United States Patent
Lui et al.

(10) Patent No.: US 6,559,869 B1
(45) Date of Patent: May 6, 2003

(54) ADAPTIVE AUTO-SCROLLING MERGE FOR HAND WRITTEN INPUT

(75) Inventors: Charlton E. Lui, Redmond, WA (US); Chee Chew, Redmond, WA (US); Dan W. Altman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/565,045

(22) Filed: May 4, 2000

(51) Int. Cl.[7] .................................................. G06F 3/00
(52) U.S. Cl. ....................................... 345/785; 345/169
(58) Field of Search ................................. 345/764, 770, 345/779, 784, 785, 786, 787, 788, 169, 173, 157, 159

(56) References Cited

U.S. PATENT DOCUMENTS

| 5,528,260 A | * | 6/1996 | Kent ........................... 345/123 |
| 5,533,182 A | * | 7/1996 | Bates et al. .................. 345/157 |
| 5,760,773 A | * | 6/1998 | Berman et al. ............. 345/808 |

* cited by examiner

*Primary Examiner*—Cao H. Nguyen
(74) *Attorney, Agent, or Firm*—Merchant & Gould (57) ABSTRACT

An adaptive auto-scrolling merge operation automatically accepts pen-based input data into a hand-held or palm sized computer and places the input data onto a line of a window in which a user intended the input data to be placed. Computing systems that accept input from users typically accept data items to be inserted into a scrollable window that is displayed by the computer. When a user is inserting data items at the end of the window, computing systems may automatically scroll the displayed portion of the window when data has been added to the last line of the window. Because pen based systems do not use a cursor located at an insertion point to know where a user wants new data items to be inserted, the new data items are inserted into the document at the location corresponding to the place within the window in which the user drew the pen strokes used to create the data item. When a user intends to add one or more data items onto the last line of a window after a data item was previously inserted onto the last line of a window, the user may place the pen strokes on the current last line of window to created these new data items whether or not the auto-scroll operation has occurred. The adaptive auto-scroll and merge detects the insertion of a data item onto the last line of a window following an auto-scroll operation and automatically moves the data item to its intended location.

18 Claims, 9 Drawing Sheets

ADAPTIVE AUTO-SCROLLING MERGE FOR HAND WRITTEN INPUT

TECHNICAL FIELD

This invention relates in general to a method, apparatus, and article of manufacture for providing a data input interface for a hand-held computing system. More particularly this invention relates to providing an adaptive auto-scrolling merge for automatically accepting pen-based input data into a hand-held or palm sized computer and placing the input data onto a desired line.

BACKGROUND

Pen input based computing systems are becoming increasingly prevalent with the creation of hand-held computing systems. When a user enters data into a pen input based computing system, typically the hand-held computer operates in one of a number of input operating modes. These operating modes may include an ink pen input mode, a text input mode, and a data item selection mode.

When the hand-held computer is operating in the ink pen input mode, the user creates pen strokes on a display when creating data items within a window on the hand-held computer. These pen strokes correspond to the use of an ink pen that places marks on a sheet of paper when a user makes the pen strokes. The difference between a hand-held computer and a sheet of paper is the fact that the ink is electronically created, and thus moveable, on a hand-held computer display.

Computing systems that accept input from users typically accept data items to be inserted into a window that is displayed by the computer. The window displays a portion of the entire document with the window permitting the displayed portion to be scrolled to any position to permit a user to view all parts of the document. When a user is inserting data items at the bottom of the window, computing systems may automatically scroll the displayed portion of the window when data has been added to the last line of the window. This scroll operation creates additional empty lines at the end of the document that are now displayed within the window to provide the user with an area to continue to insert additional data if desired.

Pen based systems, unlike keyboard based input systems, do not use a cursor located at an insertion point to know where a user wants new data items to be inserted. Instead, the new data items are inserted into the document at the location corresponding to the place within the window in which the user drew the pen strokes used to create the data item. This procedure works well except when a user attempts to insert additional data items onto the last line of a window following the insertion of previous data item on the last line. The insertion of the previous data item onto the last line may cause the window to perform an auto-scroll operation. The auto-scroll operation thus moves the previous last line upward while inserting additional lines at the bottom of the window.

When a user intends to add one or more data items onto the last line of a window after a data item was previously inserted onto the last line of a window, the user may place the pen strokes on the current last line of window to created these new data items whether or not the auto-scroll operation has occurred. This result occurs because the user may not realize that the auto scroll operation has occurred, and thus the "paper has moved upward" from beneath the pen. This fact causes the user to place the new data item at a location within the window that does not correspond to the user's intended location. As a result, a user must stop data entry and manually move the data items to the intended location before resuming entering data. These additional steps make a pen-based user interface provided by a hand-held computer difficult and inefficient to use to enter data.

SUMMARY

In accordance with the present invention, the above and other problems are solved by providing an adaptive auto-scrolling merge to automatically accept pen-based input data into a pen-based computing system, such as a hand-held or palm sized, computer and to place the input data onto a line of a as intended by the user. The user of a pen input based computing system, such as a hand-held computer, does not need to stop data entry and manually move the data items to the intended location before resuming entering data following the occurrence of an auto-scroll operation within the displayed window. This feature will improve the user efficiency in operating the pen input based computing system.

One aspect of the present invention is a method for providing an adaptive auto-scrolling merge to automatically accept pen-based input data into a hand-held or palm sized computer. The method detects the occurrence of an auto-scroll operation of a display window following the insertion of a first data item within a first last line of the display window. Also the method detects the insertion of a second data item following the occurrence of the auto-scroll operation, and determines whether the second data item was intended to be inserted within the first last line. The method then merges the second data item with the first data item within the first last line of the display if the second data item was intended to be inserted within the first last line.

Another aspect of the present invention is a computer program product readable by a computing system and encoding a set of computer instructions in a computer process for providing an adaptive auto-scrolling merge to automatically accept pen-based input data into a hand-held or palm sized computer. The computer process detects the occurrence of an auto-scroll operation of a display window following the insertion of a first data item within a first last line of the display window. It also detects the insertion of a second data item following the occurrence of the auto-scroll operation. The computer process determines whether the second data item was inserted within a second last line of the window display, and whether the second data item was inserted within a predefined period of time from the occurrence of the auto-scroll operation If the second data item was intended to be inserted within the first last lines the computer process merges the second data item with the first data item within the first last line of the display. The second last line of the window display corresponds to the current last line of the window display following the occurrence of the auto-scroll operation, The first last line of the window display corresponds to the last line of the window display before the occurrence of the auto-scroll operation. The second data item was intended to be inserted within the first last line of the window display if the second data item is inserted within the second last line of the display within the predefined period of time following the occurrence of the auto-scroll operation.

Yet another aspect of the present invention is an apparatus for providing an adaptive auto-scrolling merge to automatically accept pen-based input data into a window display on a hand-held computer. The apparatus has a programmable processor, a pen-based display for automatically accept pen-based input data into the apparatus, and a user interface module for providing a pen-based data input interface to the apparatus. An auto-scrolling and merge module detects the occurrence of an auto-scroll operation of a display window following the insertion of a first data item within a first last line of the display window. A data item input module detects the insertion of a second data item following the occurrence of the auto-scroll operation. An auto-scroll and merge control module determines whether the second data item was intended to be inserted within the first last line, and a data item merge module merges the second data item with the first data item within the first last line of the display if the second data item was intended to be inserted within the first last line.

These and various other features as well as advantages, which characterize the present invention, will be apparent from a reading of the following detailed description and a review of the associated drawings.

DETAILED DESCRIPTION

Figure 1:
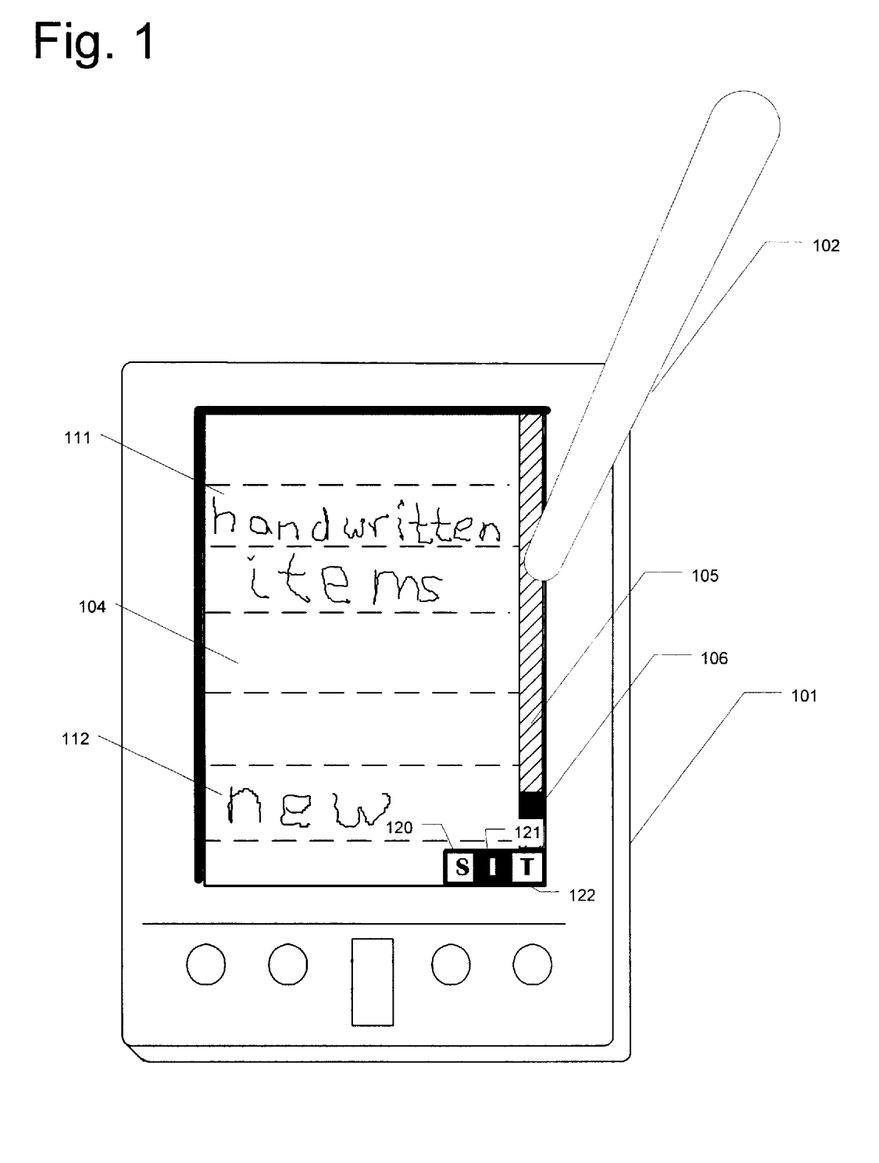
FIG. 1 illustrates a hand-held computer having hand written data items according to one embodiment of the present invention.

FIG. 1 illustrates a hand-held computer having data items within a window according to one embodiment of the present invention. The hand held or palm-sized computer 101 is used with an input pen 102 to enter data items 111–112 by writing on the screen 104. These data items may include any number of user created data items 111. These data items are illustrated as hand written items 111–112; however, these data items may also include text items as well as other forms of data.

The user of the hand held computer 101 typically enters data items onto a presently active window on the display 104. This window may display part or all of the data items present. The window appears as a scrolled document having a plurality of lines or areas for the data items to be placed. The window displays a portion of the entire document and may be scrolled to view any desired portion of the entire document.

As the contents are scrolled by a user, a scroll indicator 106 will move along a scroll bar 105 to indicate which portion of the entire document is being displayed. When the scroll indicator is located at the top of the window, the window is displaying the beginning of the document. When the scroll indicator is located at the bottom of the window, the window is displaying the end of the document. The scroll indicator 106 is placed in the middle of the scroll bar when the window is displaying a center portion of the document. The scroll indicator 106 will move upwards and downwards as the window is scrolled to display various portions of the document.

After a user adds a data item 112 in the last line of a displayed window, the auto-scrolling process automatically scrolls the window upwards to play the prior last line in the middle of the display. This provides the user additional working space at the end of the document. This additional space is provided the user for insertion of additional data items after the previous last line if desired.

The hand-held computer 101 typically displays one or more input controls 120–122 to allow the user to select an operating input mode for the hand-held computer 101. These operating modes may include an ink pen input mode, a text input mode, and a data item selection mode. The operation of the hand-held computer may differ greatly depending upon the operating mode in which the computer is currently set.

When the computer is operating in the ink pen input mode, pen strokes typically are treated as entering graphical pen strokes onto a data window in a similar manner to the drawing of a line onto a sheet of paper. When the computer is operating in the text input mode, the user typically uses a soft input window to enter text characters as if printing or typing at a keyboard. Finally when a computer is operating in the data item selection mode, the pen strokes are interpreted as an instruction to select the data items over which the pen stroke is made.

A user switches between these operating modes by indicating which operating mode is desired using a control input 120–122. Control inputs 120–122 are typically used to specify any number of operational parameters such as input mode operation of a pen input based computing system. These systems typically require the user to constantly change the operating mode between the possible operating modes using the control inputs. As such, a user may interact with the control inputs to constantly switch the operating mode of the user interface between every pen stroke if a complex set of data items is to be edited. Any other user interface command input method may be used to select the operating mode for the computer without deviating from the spirit and scope of the present invention.

Figure 2:
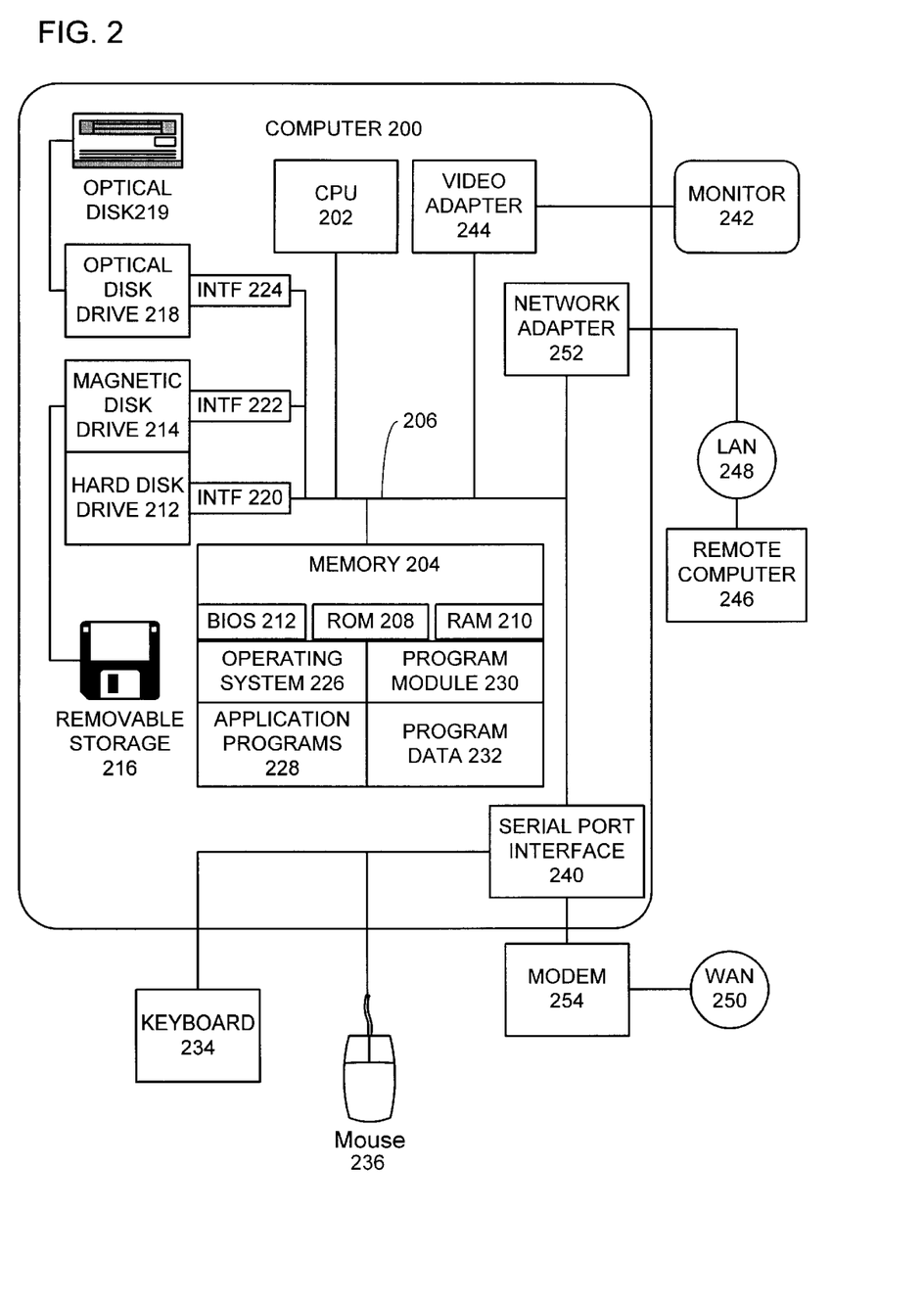
FIG. 2 illustrates a general purpose computing system for use as one more computing systems according to embodiment of the present invention.

The auto-scrolling processing described above operated when the hand-held computer 101 is operating in any input data mode. The description provided herein illustrates an embodiment that operates using hand-written ink pen data items 111–112. However, one skilled in the are will recognize that other forms of displayed data such as text, audio, or video may be used with the auto-scrolling and merge operation recited within the attached claims without deviating from the spirit and scope of the present invention FIG. 2 illustrates a computing system that may be used as the hand-held computing system according to one embodiment of the present invention. An exemplary computing system for embodiments of the invention includes a general purpose computing device in the form of a conventional computer system 200 capable of accepting pen-based input data, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the computer system 200, is stored in ROM 208.

The computer system 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the computer system 200.

Although the exemplary environment described herein may employ a hard disk, a removable magnetic disk 316, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the computer system 200 through input devices such as a keyboard 234 and mouse 236 or other pointing device. Examples of other input devices may include a microphone, joystick, game pad, satellite dish, and scanner. Pen-based computing systems also accept user input when a user presses a stylus onto the computer display and makes pen strokes similar to strokes made by a pen on paper. The pen-based computing systems are capable of interpreting and capturing these pen strokes as input to these computing systems.

These and other input devices are often connected to the processing unit 202 through a serial port interface 240 that is coupled to the system bus 206. Nevertheless, these input devices also may be connected by other interfaces, such as a parallel port, game port, or a universal serial bus (USB). An LCD display 242 or other type of display device is also connected to the system bus 206 via an interface, such as a video adapter 244. In addition to the display 242, computer systems typically include other peripheral output devices (not shown), such as speakers and printers.

The computer system 200 may operate in a networked environment using logical connections to one or more remote computers, such as a remote computer 246. The remote computer 246 may be a computer system, a server, a router, a network PC, a peer device or other common network node, and typically includes many or all of the elements described above relative to the computer system 200. The network connections include a local area network (LAN) 248 and a wide area network (WAN) 250. Such networking environments are commonplace in offices, enterprise-wide computer networks, intranets, and the Internet.

When used in a LAN networking environment, the computer system 200 is connected to the local network 248 through a network interface or adapter 252. When used in a WAN networking environment, the computer system 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the computer system 200, or portions thereof, may be stored in the remote memory storage device. It will be appreciated that the network connections shown are exemplary and other means of establishing a communications link between the computers may be used.

The embodiments of the invention described herein are implemented as logical operations in a hand-held or palm-sized computing system capable of accepting pen-based input data. The logical operations are implemented (1) as a sequence of computer implemented steps or program modules running on a computer system and (2) as interconnected logic or hardware modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 3:
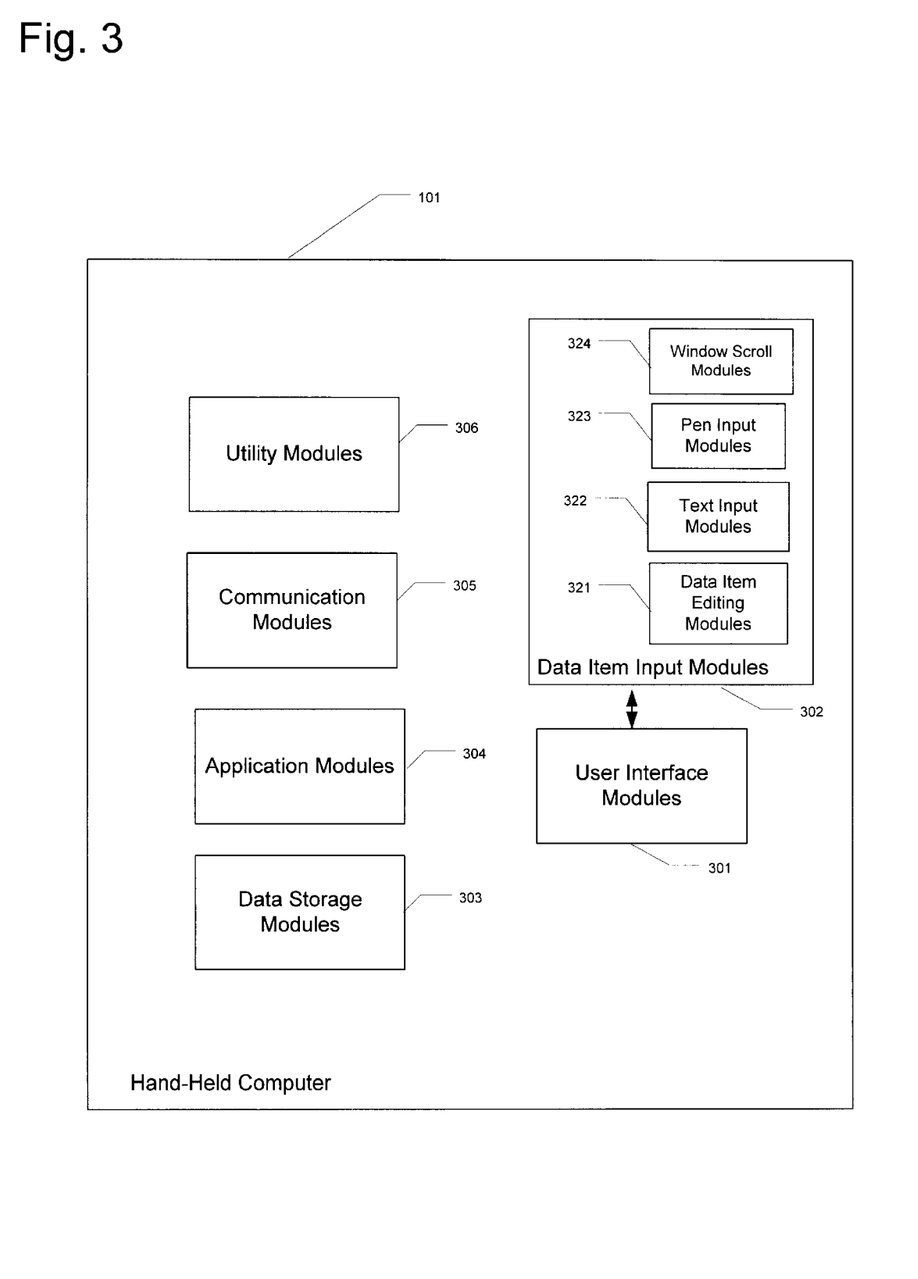
FIG. 3 illustrates a hand-held computer having processing modules to implement a pen-based user interface according to another embodiment of the present invention.

FIG. 3 illustrates a hand-held computer having processing modules to implement a pen-based user interface according to another embodiment of the present invention. The hand-held computer includes various processing modules used to implement its functions. These processing modules include a user interface module 301, a data item input module 302, a data storage module 303, one or more application modules 304, a communication module 305, and a utility module 306. The application modules 304 typically include a personal information manager (PIM) having a datebook, address book, notepad, and to do list. The application modules 304 interact with the data storage module 303, data item input module 302, user interface module 301, communication module 305, and utility module 306 to provide the desired functionality.

The adaptive auto-scrolling and merge processing is performed within the data item input module 302 utilizing a pen input module 323, a text input module 322, a data item editing module 321, and a window scroll module 324. The data item input module 302 interacts with other user interface modules 301 to provide the interaction with the user when the user draws data items on the display 104 of the hand held computer using a pen 102. The pen input modules 323 interpret pen strokes drawn on the display 104 of the hand held computer 101, when the hand held computer 101 is operating in a pen input mode. The text input modules 322 interpret input commands to enter text data such as ASCII characters when the hand held computer 101 is operating in a text input mode. The data item editing modules 321 interpret pen strokes and input commands to select, edit, and delete the data items stored within the hand hdd computer 101.

The window scroll module 324 performs the auto-scrolling function of determining when a user has added a data item to the last line of a currently active window and automatically scrolling the window after a predetermined period of time after the data item has been completed. This module 324 will also perform the merge operation according to one embodiment of the present invention. These modules 321–324 interact with other user interface modules 301 to provide this functionality to the user of the hand held computer 101.

Figure 4A:
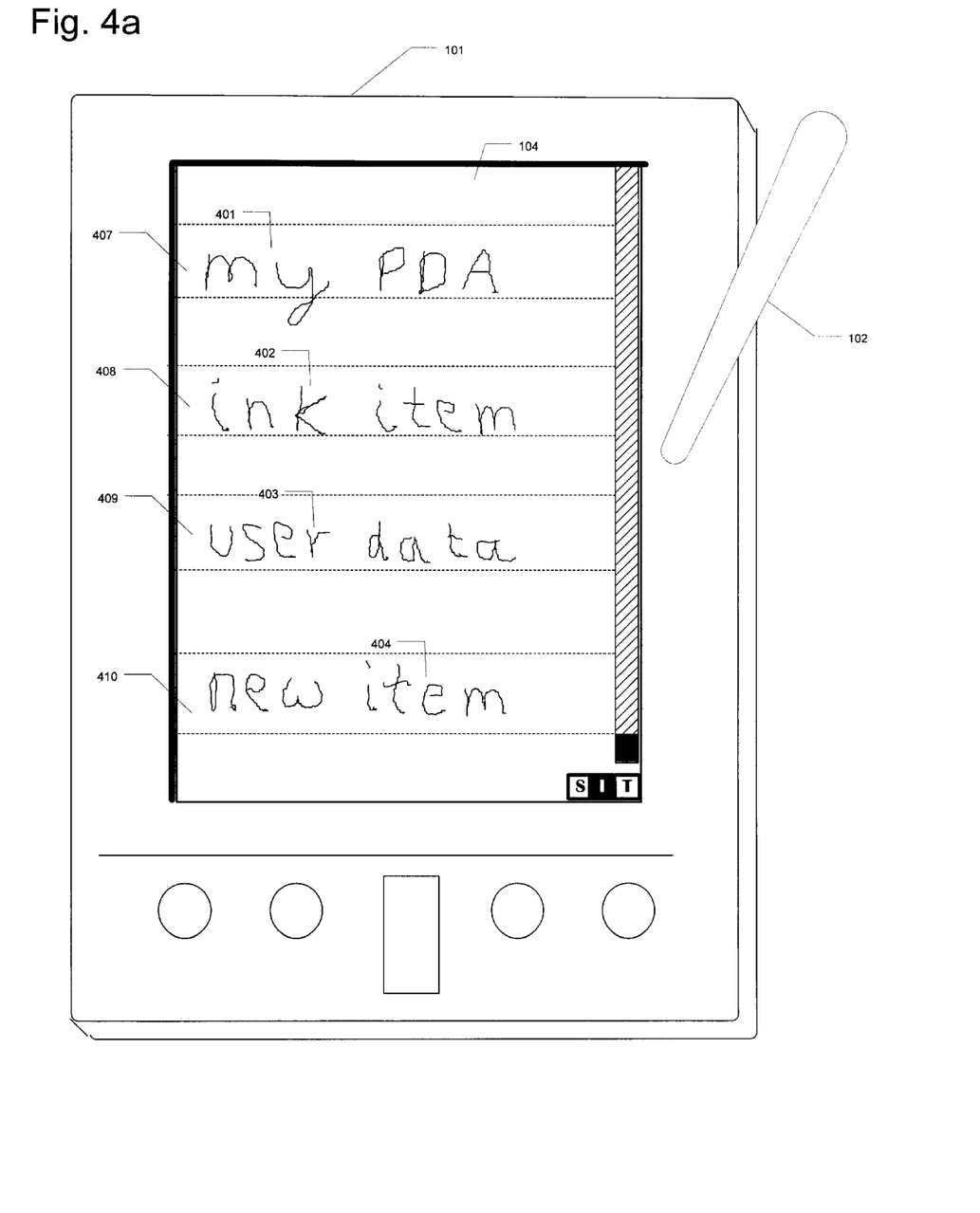
FIGS. 4a–c illustrates a hand-held computing system having multiple hand-written data items in which an auto-scroll and merge operation is performed according to one embodiment of the present invention.

FIG. 4a illustrates a hand-held or palm-sized computer having a plurality of data items 401–404 placed upon various lines 407–410 within an active window. A data item 404 has been placed within the current last line of the window 410 with the display 104 illustrating the state of the display just before an auto-scroll operation occurs. After the passage of the predetermined period of time from the completion of the data item 404, the hand-held computer 101 will perform an auto-scroll operation upon the display to provide the user with additional space at the bottom of the display to add new data items.

Figure 4B:
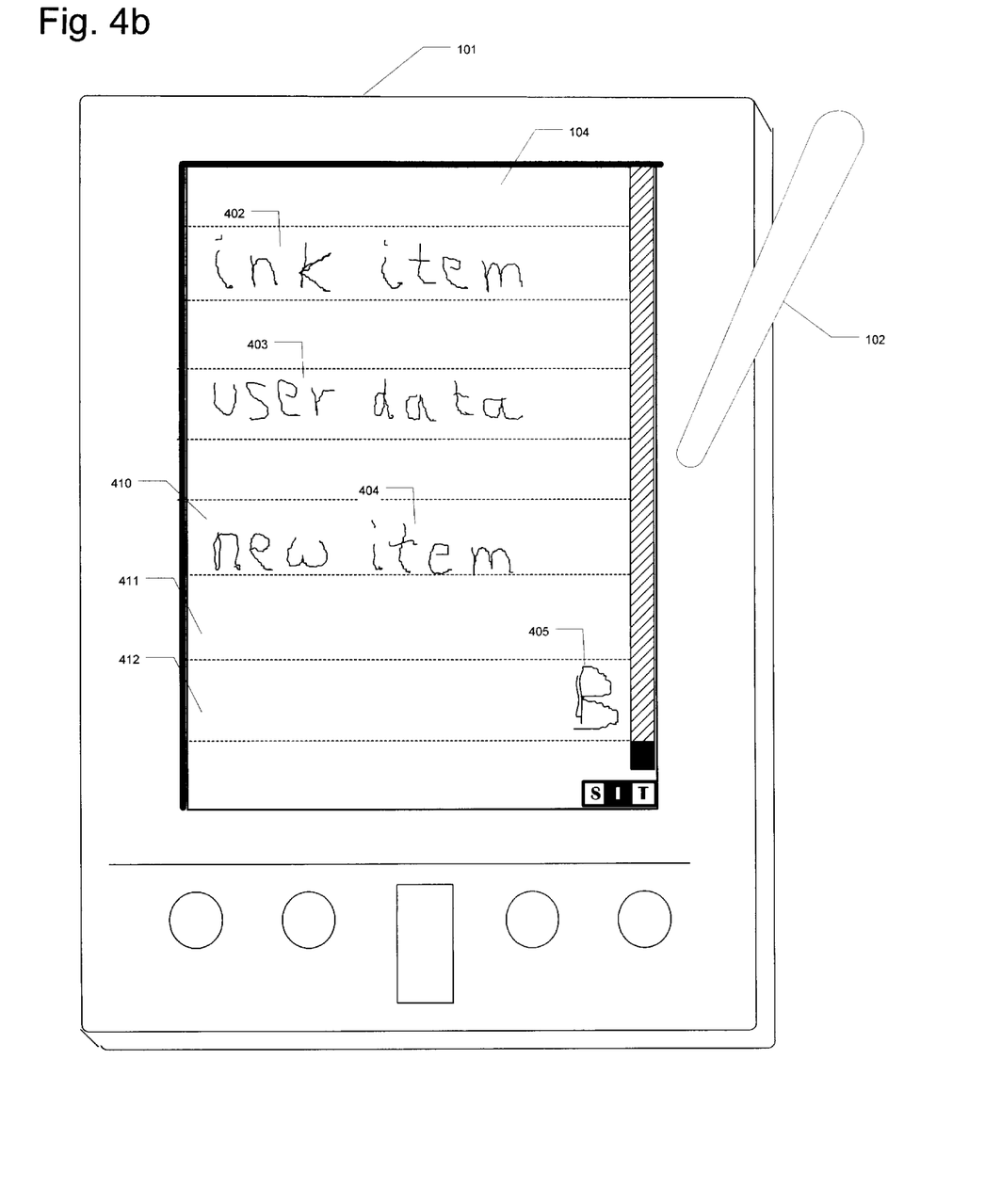

FIG. 4b illustrates a hand-held or palm-sized computer after the auto scroll operation has occurred to the active window. The window now displays the last data items 402–404 in positions corresponding to the active window being scrolled. Additional lines 411–410 have been added to the window. The previous last line of the window 410 that has the "new item" data item 404 appears in the middle of the display 104.

A new data item, a hand-written "B" 405, has also been inserted within the now current last line 412 of the window. If the auto-scroll operation has just occurred, the user may intend the B data item 405 to have been placed within the previous last line 410 rather than the current last line 412 of the display. This result occurs when the user enters a data item to the last line of a display and pauses just long enough to trigger the auto-scroll operation to occur before the user begins to add the additional data items to the last line. Because the user may not notice the performance of the auto-scroll operation before beginning to add the B 405 data item, the user mistakenly places the B data item 405 on the current last line 412 rather than the desired previous last line 410. This result causes the user to need to stop data input to edit the window in order to move the B data item 405 from the current last line 412 to the previous last line 410 of the display.

Figure 4C:
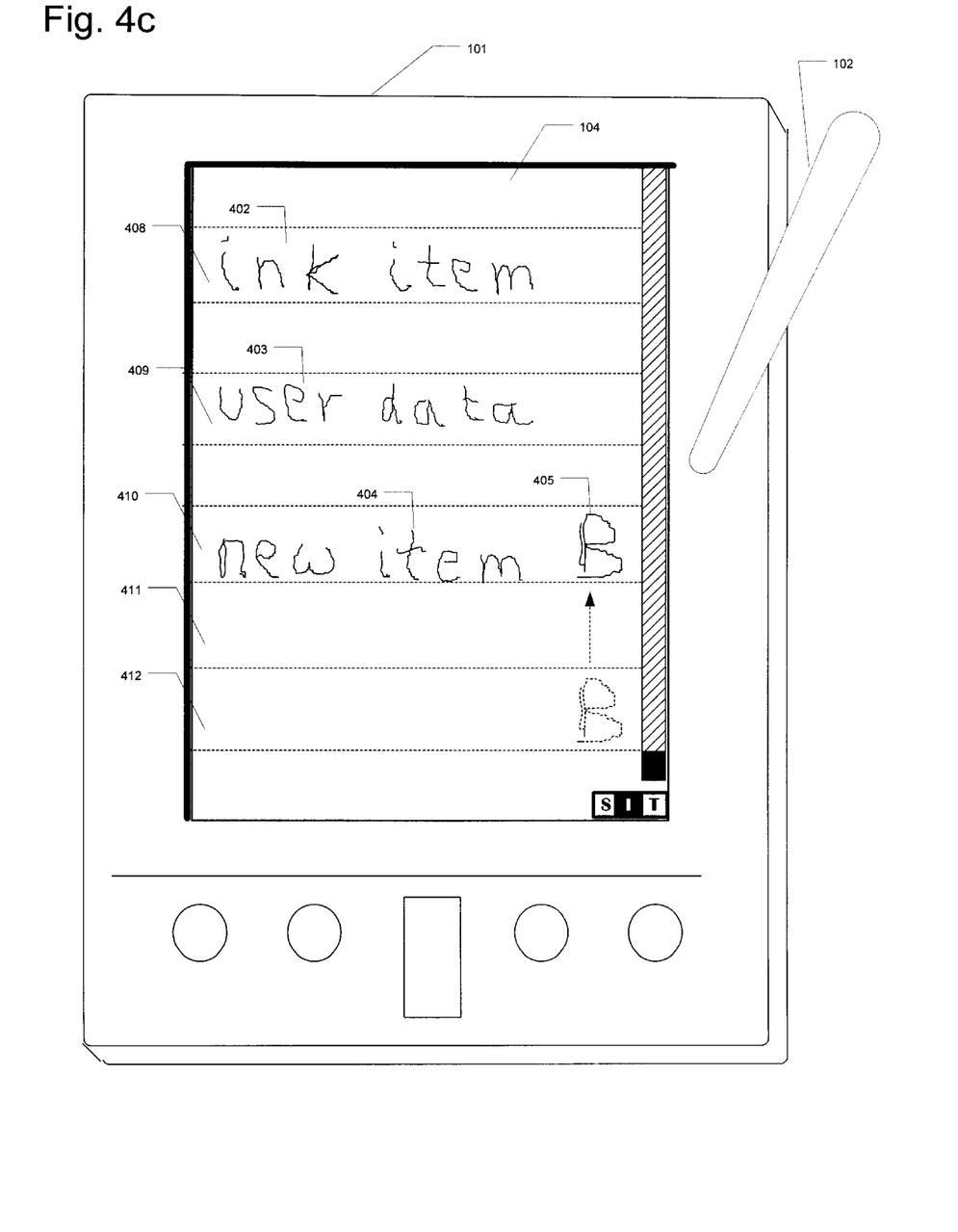

FIG. 4c illustrates a hand-held computer after a merge operation has been applied to a newly added data item 405 that was added to the current last line of the display 104 shortly after an auto-scroll operation has occurred. The hand-held computer 101 automatically moves the new data item from the current last line 412 to the previous last line 410 of the display 104 as part of the auto-scrolling and merge operation according to an embodiment of the present invention. The auto-scrolling and merge operation moves the B data item 405 if the B data item 405 is added to the current last line 412 within a predetermined period of time after an auto-scroll operation has occurred to the display 104.

This auto-scrolling and merge operation will only perform the move operation if the B data item 405 is the first data item added to the display following the occurrence of the auto-scrolling operation. This additional test is used as the assumption is made that the new data item 405 was intended to be merged onto the previous last line 410 as if the data item 404 that caused the auto-scroll operation to occur and the new data item 405 were created with one continuous action having a short pause between the insertion of the data items 404–405. If the user inserts a data item onto a non-last line 408–411 following the occurrence of the auto-scroll operation, the assumption is made that the new data item was not intended to be added to the last line of the display but for the occurrence of the auto-scroll operation.

Figure 5:
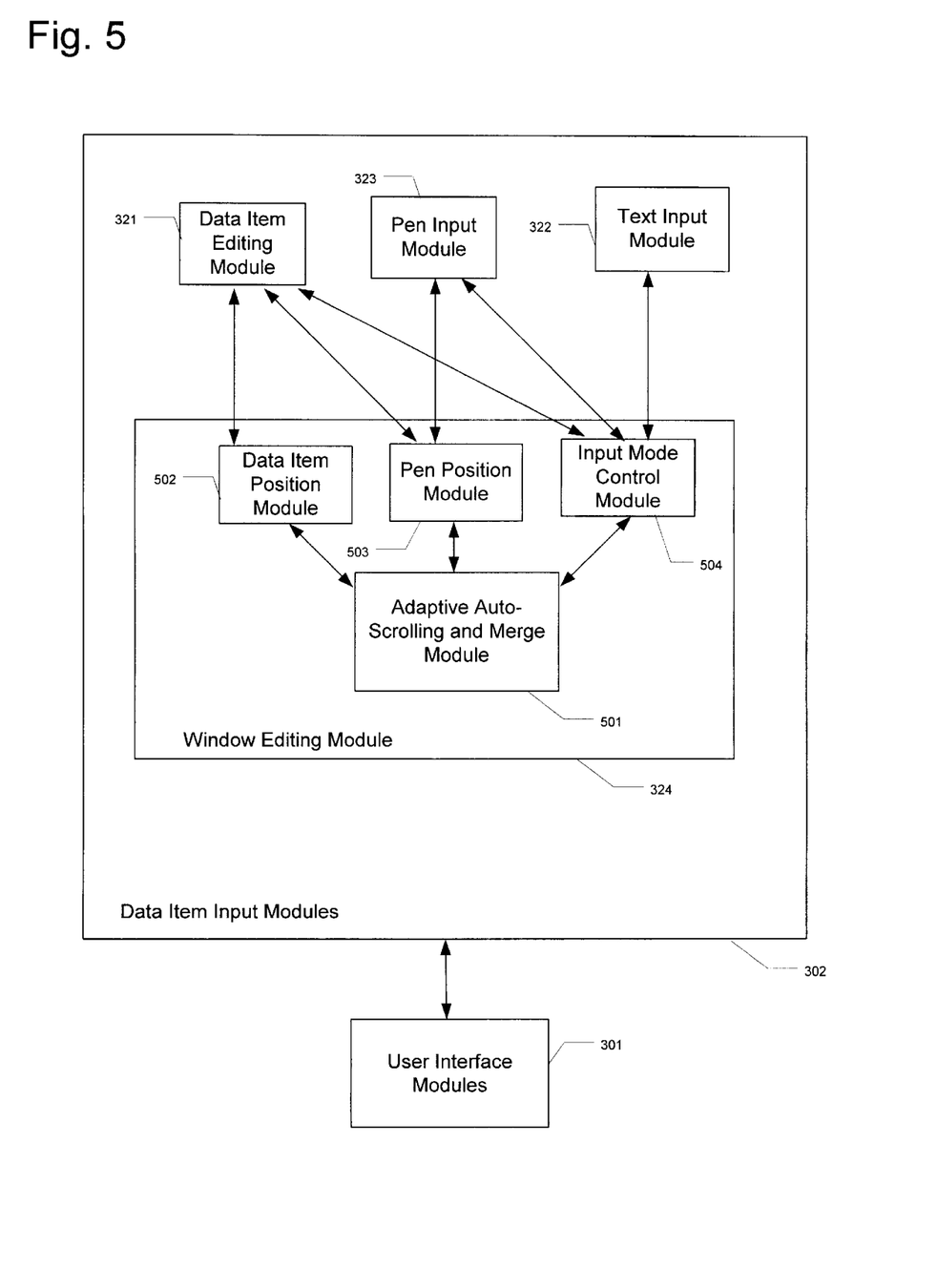
FIG. 5 illustrates a data item input module according to one possible embodiment of the present invention.

FIG. 5 illustrates a data item input module according to one possible embodiment of the present invention. The data item input module 302 interacts with one or more user interface modules 301 to accept the input of data items, to permit existing data items to be altered and deleted, and to pass these data items to various application modules 304 for use in creating, editing, and displaying data within a window on a hand-held computer 101. The data item input modules comprises a text input module 322 to permit text data. to be entered into the hand-held computer 101 and a pen input module 323 to permit pen ink data to be entered into the hand-held computer 101. The other data formats would possess a corresponding input module for accepting the input of the data from the user and processing the data into a format that may be represented and stored within the hand-held computer. The data would be represented upon the display of the hand-held computer at least as an icon that may be selected, edited, and deleted in the same manner that ink and text data is manipulated herein.

The data item input module 302 comprises a data item editing module 321 that performs the data item selection and editing operations. The data item input module 302 also comprises a window scrolling module 324 that performs the auto-scrolling processing as well as the merge processing to place newly inserted data items at locations corresponding to positions intended by the user.

The window scrolling module 324 comprises a comprises a data item position module 502, a pen position module 503, and an input mode control module 504 that all interact with the window scrolling module 501 to perform the auto-scrolling and merge operations.

The data item position module 502 determines the position of data items that are located within a window within the hand-held computer 101. These positions are needed to determine whether the last inserted data item is located within the last line of the display 104. Similarly, the pen position module 503 provides the position information for a pen stroke corresponding to a newly added data item that is used by the window scrolling module 501 to determine if the auto scrolling and merge operations are to occur.

The input mode control module 504 performs the operations necessary to maintain the various operating modes as well as to detect instructions to switch from one mode to another. Typically, an input control 120–122 exists within the user interface to permit the user to indicate the operating mode that he or she wishes the computer 101 to be operating in. These input controls 120–122 may include selection buttons such as radio buttons that a user can activate or deactivate as desired. These controls may also include pop-up menu options that are selected using a pointing device such as a pen 102 to set the current operating mode. Any other user interface command input method to select the operating mode for the computer may be used without deviating from the spirit and scope of the present invention as set forth in the claims recited herein.

The adaptive auto-scrolling and merge module 501 accepts data from the other modules within the window scrolling module 324 to determine whether an auto-scroll operation has occurred, whether the new data item has been inserted in to the current last line of the display, and whether the new data item has been inserted into the window within the predetermined time period. These test operations are needed by the adaptive auto-scrolling and merge module 501 to determine if a merge operation should occur. The particular operation performed by the adaptive auto-scrolling and merge module 501 are best illustrated using the particular examples shown in FIGS. 4a, 4b and 4c as discussed above.

The adaptive auto-scrolling and merge module 501 may apply other testing criteria to characteristics of the new data item 405 to determine whether it should be merged into the previous last line 410 of the display 104. These other testing criteria include determining from the size and location of the new data item 405 if it corresponds to a pen stroke that may represent a dot of an "i" or the cross of a "t". These types of pen strokes are more likely to have been intended to be merged with the previous last line 405 than other types of pen strokes. In one embodiment, a hand-held computer 101 may merge only these more limited types of new data items 405.

In another embodiment, the hand-held computer 101 may attempt to detect the presence of a "word" from either the number of pen strokes used to create the new data item 405 or to detect the presence of a word by applying hand-writing recognition processing to the new data item 405. If the new data item 405 is determined to be a word to a specified level of confidence, the adaptive auto-scrolling and merge module 501 may choose to merge only non-words.

Additionally, the adaptive auto-scrolling and merge module 501 may include a test to require the new data item 405 to be located at an x,y position of the current last line that does not require the new data item 405 to be merged on top of a existing data item located on the previous last line 410. When the adaptive auto-scrolling and merge module 501 detects that the new data item 405 will be merged on top of an existing data item, the module 501 can refuse to perform the merge operation and leave the new data item 405 in the current last line 412. In another embodiment, the adaptive auto-scrolling and merge module 501 can append the new data item 405 to the end of the previous last line 410 rather than merge the new data item 405 onto an existing data item.

All of the above tests to determine whether a new data item 405 should be merged by the adaptive auto-scrolling and merge module 501 may be specified using a set of user settable parameters that enable and disable each particular test. These parameters may be specified by the user using control inputs contained within a parameter window. One skilled in the art will recognize that any combination of the above tests whether to merge a new data item 405 onto a previous last line 410 may be used without deviating from the spirit and scope of the present invention as set forth in the claims recited hereinafter.

Figure 6:
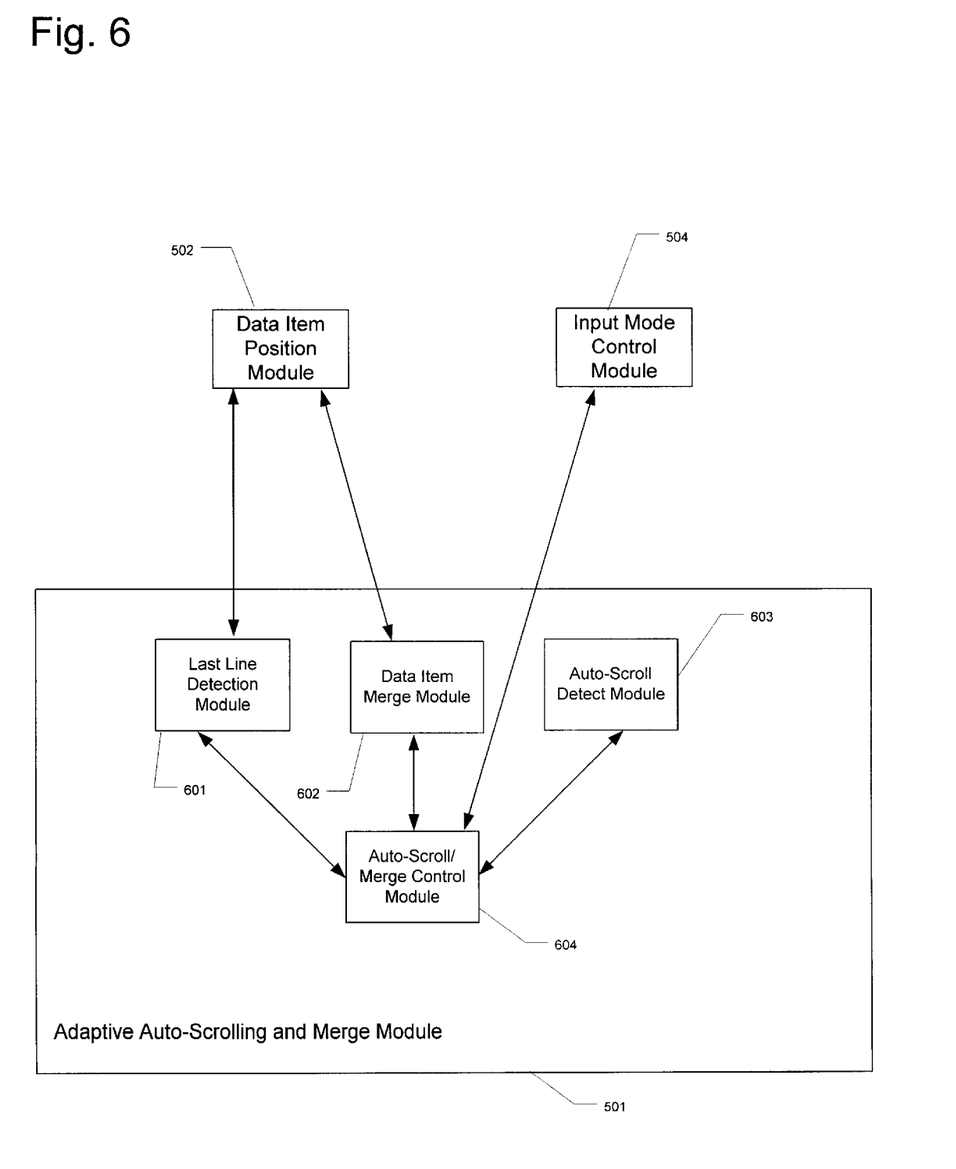
FIG. 6 illustrates an adaptive auto-scrolling and merge processing module according to one possible embodiment of the present invention.

FIG. 6 illustrates adaptive auto-scrolling and merge module 501 according to one embodiment of the present invention. The adaptive auto-scrolling and merge module 501 comprises a last line detection module 601, a data item merge module 602, an auto-scroll detect module 603, and an auto-scroll/merge control module 604. The last line detection module 601 determines whether a data item is located in the last line of a window display 104. This module 601 will provide an indication to the auto-scroll/merge control module 604 that a auto-scroll operation or a merge operation may be required because of the insertion of the data item.

The data item merge module 602 receives signals from the auto-scroll/merge control module 604 that the new data item needs to be merged from the current last line 412 to the previous last line 410. This module 602 will determine whether the merge operation will cause the new data item to be placed on top of an existing data item. This module 602 also performs the move operation to the new data item from the current last line 412 to the previous last line 410 to merge and append the new data item within the previous last line 410.

The auto-scroll detect module 603 determines when an auto-scroll operation should occur from signals received from the auto-scroll/merge control module 604 that are sent in response to a signal generated by the last line detection module 601. If a auto-scroll operation should occur, the auto-scroll detect module 603 generates a scroll signal to the auto-scroll/merge control module 604. This is done after the passage of the predetermined period of time following the completion of the data item that is located within the last line of a display 104 without the creation of another data item.

The auto-scroll/merge control module 604 interacts with the last line detection module 601, the data item merge module 602, and the auto-scroll detect module 603 to determine if the auto-scroll and the merge operations are to occur. This module 604 also performs the auto-scroll operation when necessary.

Figure 7:
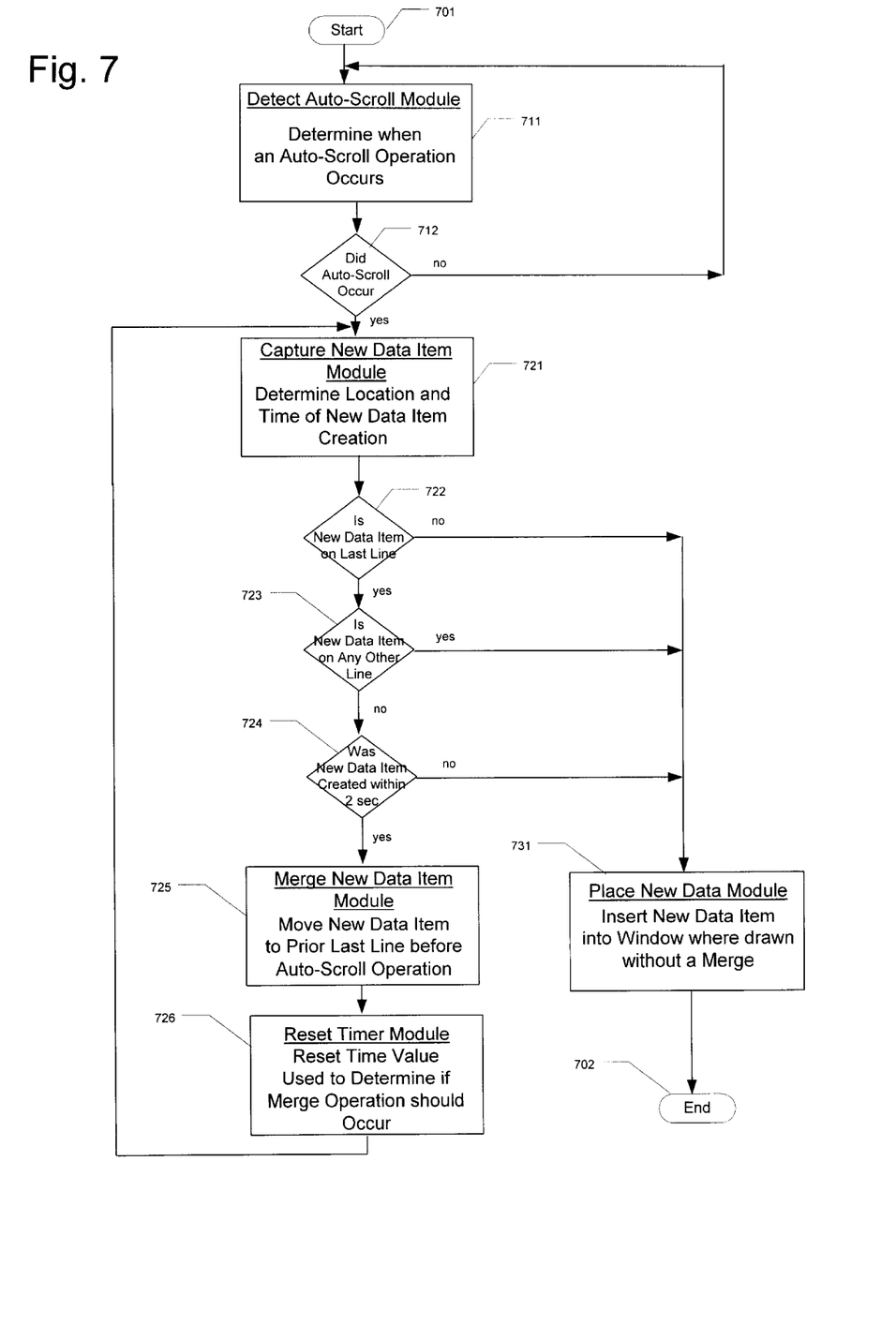
FIG. 7 illustrates an operational flow for an adaptive auto-scrolling and merge process according to an exemplary preferred embodiment of the present invention.

FIG. 7 illustrates an operational flow for an adaptive auto-scrolling and merge operations according to an exemplary preferred embodiment of the present invention. The operation of the adaptive auto-scrolling and merge operations begins at 701 and enters a loop to locate the occurrence of an auto-scroll operation. A detect auto-scroll operation 711 checks to see whether a last insertion of a data item caused an auto-detect operation to occur. This module 711 also determines the time when the auto-scroll operation occurs. Test operation 712 determines if an auto-scroll occurred. If not, the processing remains in the loop until one occurs.

Once an auto-scroll operation occurs, it will be detected by test operation 712, and the operation flow will proceed to a capture new data item module 721. The capture new data item module 721 determines the location and time of creation for the new data item. These properties for the new data item are used to determine whether the new data item is to be merged from the current last line to the previous last line of the display.

Test operation 722 determines if the new data item is located within the current last line of the display 104. If the new data item is not located within the current last line of the display 104, no merge is to occur and the operation flow proceeds to a place new data module 731.

If the new data item is located within the current last line of the display 104, the processing proceeds to a test operation 723. Test operation 723 determines if the new data item is located on any line but the current last line of the display 104. If the new data item is located within any line but the current last line, no merge is to occur as the user did not intend to continue writing on a line that was moved by the auto-scroll operation. As a result, the operation flow proceeds to a place new data module 731.

If the new data item is located within any line but the current last line, no merge is to occur as the user did not intend to continue writing on a line that was moved by the auto-scroll operation. As a result, the operation flow proceeds to a place new data module 731.

If the new data item is not located within the current last line of the display 104, the processing proceeds to a test operation 724 where the test operation 723 determines if the new data item was created within a predetermined period of time. If the new data item was not created within a predetermined period of time, no merge is to occur as the user did not attempt to add additional data items to a line that unexpectedly moved between the creation of data items. As a result, the operation flow proceeds to a place data item module 731.

If the new data item was created within a predetermined period of time, a merge is to occur, and the operation flow continues with a merge new data item module 725. This module 725 moves the new data item from the current last line 412 to the previous last line 410 of the display. As part of the move, the module 725 merges the data item with any other data items found on the previous last line 410. In alternate embodiments, this module 725 may append the new data item to the end of the previous last line 410 rather than merge the new data item on top of an existing data item.

Once the merge operation is complete, a reset timer module is reset to zero. This permits the user to continue to insert additional data items to the current last line 412 and have them merged into the previous last line 411 until no data item is inserted within the current last line for a period of time greater than the predetermined period of time. In the preferred embodiment, the predetermined period of time is two (2) seconds. After the timer is reset, the operation flow returns to the capture new data item module 721 to repeat the processing for the next data item to be inserted. Once any of the test modules determine a merge operation is not to occur, the place data item module 731 inserts the new data item into the current last line of the display. As a result, the merge operations will not occur until the next auto-scroll operation is detected by the detect auto-scroll module 711.

The present invention is the method, apparatus, and computer program product, such as computer storage medium or propagated signal containing a computer program, for providing an adaptive auto-scrolling and merge function as part of a data input portion of a user interface within a hand-held computer as recited within the claims attached hereto. While the embodiments described above describe a hand-held computer for its operation, the present invention, as recited within the claims attached hereto, includes any computing system that utilizes a pointing device to enter data items. These computing systems may include palm-sized and hand-held computing systems as well as larger tablet based computing systems in which a display and input tablet are larger than is typically provided with hand-held and palm-sized computing devices. These computing systems may also include other computing systems having an input tablet capable of accepting pen stroke inputs as described herein. While the invention has been particularly shown and described with reference to preferred embodiments thereof, it will be understood by those skilled in the art that various other changes in the form and details may be made therein without departing form the spirit and scope of the invention.

What is claimed is:

1. A method for providing an adaptive auto-scrolling merge to automatically accept pen input data into a pen-based computer, the method comprising:

detecting the occurrence of an auto-scroll operation of a display window following the insertion of a first data item within a first last line of the display window;

detecting the insertion of a second data item following the occurrence of the auto-scroll operation;

determining whether the second data item was intended to be inserted within the first last line; and merging the second data item with the first data item within the first last line of the display if the second data item was intended to be inserted within the first last line.

2. The method according to claim 1, wherein the determining whether the second data item was intended to be inserted within the first last line further comprises:

determining whether the second data item was inserted within a second last line of the window display; and determining whether the second data item was inserted within a predefined period of time from the occurrence of the auto-scroll operation;

wherein the second last line of the window display corresponds to the current last line of the window display following the occurrence of the auto-scroll operation;

the first last line of the window display corresponds to the last line of the window display before the occurrence of the auto-scroll operation.

3. The method according to claim 2, wherein the merging the second data item with the first data item within the first last line of the display further comprises:

moving the second data item from the second last line of the display window to the first last line of the display window; and placing the second data item at a location within the first last line of the display window corresponding to its inserted location within the second last line of the display window.

4. The method according to claim 2, wherein merging the second data item with the first data item within the first last line of the display further comprises:

moving the second data item from the second last line of the display window to the first last line of the display window; and appending the second data item at a location within the first last line of the display window corresponding to a position just after all other data items located in the first last line of the display window.

5. The method according to claim 2, wherein the second data item was intended to be inserted within the first last line of the window display if the second data item is inserted within the second last line of the display within the predefined period of time following the occurrence of the auto-scroll operation.

6. The method according to claim 5, wherein the predefined amount of time is at least 2 seconds.

7. A computer program product readable by a computing system and encoding a set of computer instructions for providing an adaptive auto-scrolling merge to automatically accept pen-based input data into a hand-held or palm sized computer, the method comprising:

detecting the occurrence of an auto-scroll operation of a display window following the insertion of a first data item within a first last line of the display window;

detecting the insertion of a second data item following the occurrence of the auto-scroll operation;

determining whether the second data item was inserted within a second last line of the window display;

determining whether the second data item was inserted within a predefined period of time from the occurrence of the auto-scroll operation; and merging the second data item with the first data item within the first last line of the display if the second data item was intended to be inserted within the first last line;

wherein
the second last line of the window display corresponds to the current last line of the window display following the occurrence of the auto-scroll operation;
the first last line of the window display corresponds to the last line of the window display before the occurrence of the auto-scroll operation; and
the second data item was intended to be inserted within the first last line of the window display if the second data item is inserted within the second last line of the display within the predefined period of time following the occurrence of the auto-scroll operation.

8. The computer program product according to claim 7, wherein the merging the second data item with the first data item within the first last line of the display further comprises:
moving the second data item from the second last line of the display window to the first last line of the display window; and
placing the second data item at a location within the first last line of the display window corresponding to its inserted location within the second last line of the display window.

9. The computer program product according to claim 7, wherein the merging the second data item with the first data item within the first last line of the display further comprises:
moving the second data item from the second last line of the display window to the first last line of the display window; and
appending the second data item at a location within the first last line of the display window corresponding to a position just after all other data items located in the first last line of the display window.

10. The computer program product according to claim 7, wherein the predefined amount of time is 2 seconds.

11. The computer program product according to claim 7, wherein the computer program product is a computer readable storage medium.

12. The computer program product according to claim 7, wherein the computer program product is a computer generated signal encoding the computer instructions within a carrier-wave signal for transmission between computing devices.

13. An apparatus for providing an adaptive auto-scrolling merge to automatically accept pen-based input data into a window display on a hand-held computer, the apparatus comprising:
a programmable processor;
a pen-based display automatically accept pen-based input data into the apparatus;
a user interface module for providing a pen-based data input interface to the apparatus;
an auto-scrolling and merge module detecting the occurrence of an auto-scroll operation of a display window following the insertion of a first data item within a first last line of the display window;
a data item input module detecting the insertion of a second-data item following the occurrence of the auto-scroll operation;
an auto-scroll and merge control module determining whether the second data item was intended to be inserted within the first last line; and
a data item merge module merging the second data item with the first data item within the first last line of the display if the second data item was intended to be inserted within the first last line.

14. The apparatus according to claim 13, wherein the an auto-scroll and merge control module comprises:
a test module determining whether the second data item was inserted within a second lag line of the window display; and
a timer module determining whether the second data item was inserted within a predefined period of time from the occurrence of the auto-scroll operation;
wherein
the second last line of the window display corresponds to the current last line of the window display following the occurrence of the auto-scroll operation;
the first last line of the window display corresponds to the last line of the window display before the occurrence of the auto-scroll operation.

15. The apparatus according to claim 14, wherein the data item merge module comprises:
a data item moving module moving the second data item from the second last line of the display window to the first last line of the display window; and
a merge module placing the second data item at a location within the first last line of the display window corresponding to its inserted location within the second last line of the display window.

16. The apparatus according to claim 14, wherein the merging the second data item with the first data item within the first last line of the display further comprises:
a data item moving module moving the second data item from the second last line of the display window to the first last line of the display window; and
a data item append module appending the second data item at a location within the first last line of the display window corresponding to a position just after all other data items located in the first last line of the display window.

17. The apparatus according to claim 14, wherein the second data item was intended to be inserted within the first last line of the window display if the second data item is inserted within the second last line of the display within the predefined period of time following the occurrence of the auto-scroll operation.

18. The apparatus according to claim 17, wherein the predefined amount of time is at least 2 seconds.

* * * * *